United States Patent [19]

Peters

[11] Patent Number: 5,136,904
[45] Date of Patent: Aug. 11, 1992

[54] MEANS AND METHODS OF CUTTING PATTERNS WITH POWERED COPING SAWS

[76] Inventor: Stuart K. Peters, 308 Laurie Dr., Beech Island, S.C. 29841

[21] Appl. No.: 697,595

[22] Filed: May 9, 1991

[51] Int. Cl.$^5$ ............................................. B27B 19/02
[52] U.S. Cl. ......................................... 83/13; 30/275; 83/786
[58] Field of Search .................... 30/296.1, 275; 83/13, 83/56, 783–786

[56] References Cited

U.S. PATENT DOCUMENTS

| | | | |
|---|---|---|---|
| 4,554,738 | 11/1985 | Barrett et al. | 83/939 |
| 4,803,781 | 2/1989 | Jung et al. | 83/940 |
| 4,825,741 | 5/1989 | Wellington et al. | 83/748 |

Primary Examiner—Hien H. Phan
Attorney, Agent, or Firm—Laurence R. Brown

[57] ABSTRACT

Powered coping saw systems and corresponding methods of cutting workpieces with powered coping saws are provided by this invention, which holds a workpiece stationary and moves the reciprocating saw blade relative to the workpiece. By disposing the workpiece in different planes and at different angular orientation, two dimensional and three dimensional cuts may be made. The saw motor is in a frame pivotable about a base, and drives a reciprocating saw blade holding second frame pivoted in turn on the first frame to move the powered saw blade over a two dimensional cutting range generally perpendicular to the saw blade. Relative positioning of a workpiece, such as a longitudinally disposed contoured molding strip which is to be cut for matching corner mounts, for angular positioning with respect to the saw blade permits two dimensional and three dimensional cutting patterns to be followed in the workpiece. When the contoured molding is cut at an angle to its resident plane, a cutting pattern is defined on its contoured surface which can be followed by the movable, rotatable sawblade. By cutting along this defined pattern while the workpiece is stationary, as is possible with a rotating and laterally movable saw blade, a perfect joint may be cut for either chair molding joints or crown molding joints, for example.

19 Claims, 4 Drawing Sheets

MEANS AND METHODS OF CUTTING PATTERNS WITH POWERED COPING SAWS

TECHNICAL FIELD

This invention relates to powered coping saws and methods of cutting intricate patterns in workpieces, and more particularly it relates to bench mounted coping saws and methods of processing workpieces such as contoured moldings to make corner joints.

BACKGROUND ART

Coping saws have long been used manually for making patterned intricate cuts into workpieces such as craft and art designs and fitted joints for moldings. The use of a hand held coping saws for this purpose however makes the end product highly dependent upon craftsmanship skills and thus a standardized product shape is difficult to attain particularly when complex two or three dimensional patterns are involved such as necessary to fit contoured moldings into chair molding or crown molding corner joints.

Bench saws of the coping saw variety are known, for example, as shown in U.S. Pat. No. 4,825,741, May 2, 1989 to R. Wellington, et al. for Reciprocatory Machine Tool. However such saws are very limited in the types of precision repeatable pattern cuts possible since the workpiece still must be manipulated by a craftsman to develop a pattern. Furthermore the size of a workpiece that can be practically manipulated for cutting of patterns is very limited in length and area.

There have been few precision methods of cutting patterns within close tolerances with a manually held or positioned coping saw because of the depenency of a craftsman to manually align the coping saw blade axis with various work axes on the workpiece. Witness to this is the lack of precision in the making of corner joints without defects with contoured molding strips used in chair rails or crown moldings. This typically exemplifies the difficulty to follow both two dimensional and three dimensional cutting patterns with reciprocating coping saws.

Thus it is an objective of this invention to improve the state of the art in coping saw equipment and methods of use by correcting the foregoing defects.

Another object of the invention is to provide coping saw equipment and semi-automatic methods of use for precisely forming complex two dimensional and three dimensional patterns of critical cutting radiuses and in large workpieces with minimal craftsmanship skills.

DISCLOSURE OF THE INVENTION

A novel power driven coping saw system is provided to produce precisely cut two and three dimensional patterns in workpieces such as required to produce mating crown molding or chair rail corner joints. The coping saw system provides a base mounted power driven saw adapted to cut a stationary workpiece. Thus the drive motor is articulated on a pivoted frame from which in turn is pivoted a saw blade frame reciprocated by the motor to permit the sawblade to be moved over a two dimensional working range for cutting a stationary workpiece. The sawblade is additionally made rotatable in the reciprocating frame and provided with a manually operable rotation knob, which is used to guide the sawblade over a pattern on the workpiece.

To cut a three dimensional pattern in the workpiece, the plane of the workpiece may have is angular relationship changed from its normal angle perpendicular to the sawblade, generally horizontal. This is typically achieved with a workpiece table with a pivotable top positioned to insert a workpiece plane at an acute angle to the saw blade axis within the movement range of the sawblade.

With the two and three dimensional cutting capabilities of the coping saw system of this invention, cutting methods are introduced, as typified for example in the cutting of patterned corner joints in contoured longitudinal molding strips used for crown moldings or chair rails. The saw system is capable of achieving all the cuts, but an exterior rotary saw could be used to make straight line cuts at various angles through a workpiece, if available, and is preferable to exactly follow a straight line cut without manual guidance of the coping sawblade.

For crafting a precision, repeatable, corner joint pattern in a longitudinally disposed contoured chair rail molding, a cut is made perpendicular to the molding axis at forty-five degrees from the mounting plane of the molding to produce a beveled tapered end outwardly extending from the decorative surface contour. This identifies the joint pattern at the edge of the surface contour for permitting a two dimensional pattern for cutting through the workpiece with the coping saw placed normal or obliquely to the plane of the workpiece. This pattern is readily followed with the positionable and rotatable coping saw mount afforded by this invention.

In the crafting of a corner joint pattern for a contoured crown molding strip a three dimensional end cut is required on the molding strip to form a crown corner joint pattern that mates with a joining contoured surface across the entire end surface at the cut. This is achievable by cutting the molding strip in a straight line cut across the strip at both an angle of forty-five degrees to the molding longitudinal axis and forty-five degrees to the molding plane, thereby to form the cutting pattern at the merger of the bevel cut with the decorative molding surface which can be easily followed for the required cut by the coping saw afforded by this invention. That pattern is then cut through the molding strip with the molding strip held in a fixed position with its plane at an angle of forty-five degrees to horizontal to present a three dimensional cutting face on the strip from the vertically oriented cutting axis of the saw, so that the cut perfectly fits in a crown molded corner joint.

Other features, advantages and objectives of the invention will be found throughout the following more detailed description of the invention with reference to the accompanying drawings.

BRIEF DESCRIPTION OF THE DRAWINGS

In the drawings, wherein like reference characters designate similar features throughout the various views to facilitate comparison.

THE PREFERRED EMBODIMENT

Figure 1:
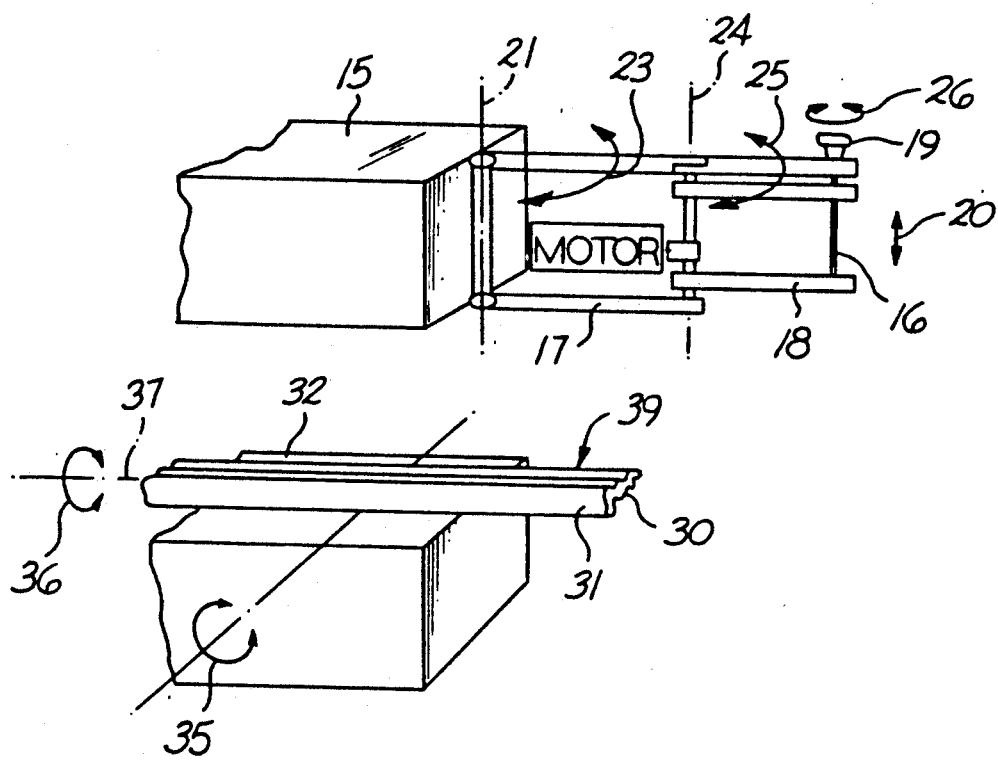
FIG. 1 is a perspective sketch of a coping saw system embodying the invention, illustrating a two dimensional cut through a chair rail molding strip.

As may be seen from FIG. 1, a base mount 15 for the bench mounted reciprocating saw blade 16 has pivotable frames 17 and 18 for permitting a two dimensional range of movement of the saw blade axial position as manually directed by means of the saw blade rotating knob 19. Thus, frame 17 pivots about pivot axis 21, as signified by the double headed arrow 23 and carries the motor 22 for powering the coping saw blade reciprocation over the pivot span. Similarly the frame 18, which carries saw blade 16 pivots about axis 24, as indicated by the double headed arrow 25 and is mounted for reciprocation by the motor 22, as indicated by the double headed arrow 20, thereby to carry the cutting blade. The manual control knob 19 rotates 360 degrees, as indicated by the double headed arrow 26 to rotate the saw blade 16, so that the saw blade 16 can be moved for cutting a two dimensional pattern 30, in a workpiece having its resident plane generally oriented normally to the saw blade axis. Note that contrary to the conventional use of a bench mounted coping saw where the workpiece is moved with respect to a stationary blade position, herein the blade position is moved while the workpiece 31 is held in a stationary position within the range of movement of the coping saw blade 16 by means such as table top 32. As indicated by respective double headed arrows 35, 36, the table, or other equivalent means, is used to respectively tilt the plane (35) of the workpiece 31 so that the longitudinal axis 37 makes an acute angle with the sawblade 16 and to rotate (36) the workpiece 31 about its longitudinal axis 37.

Figure 2:
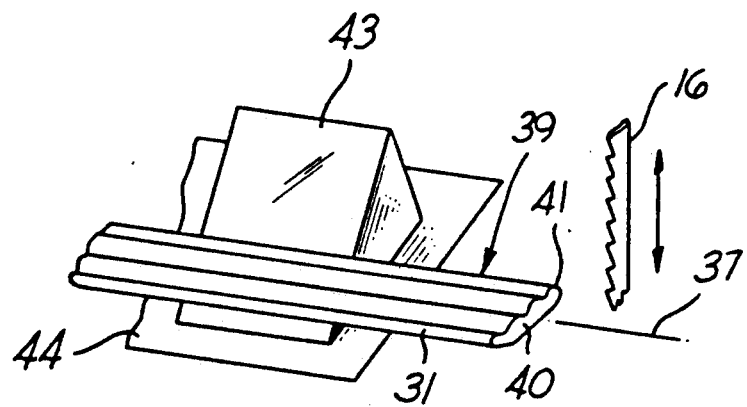
FIG. 2 is a perspective sketch illustrating the cutting of a crown rail molding strip in a three dimensional cut in accordance with this invention.
Figure 3:
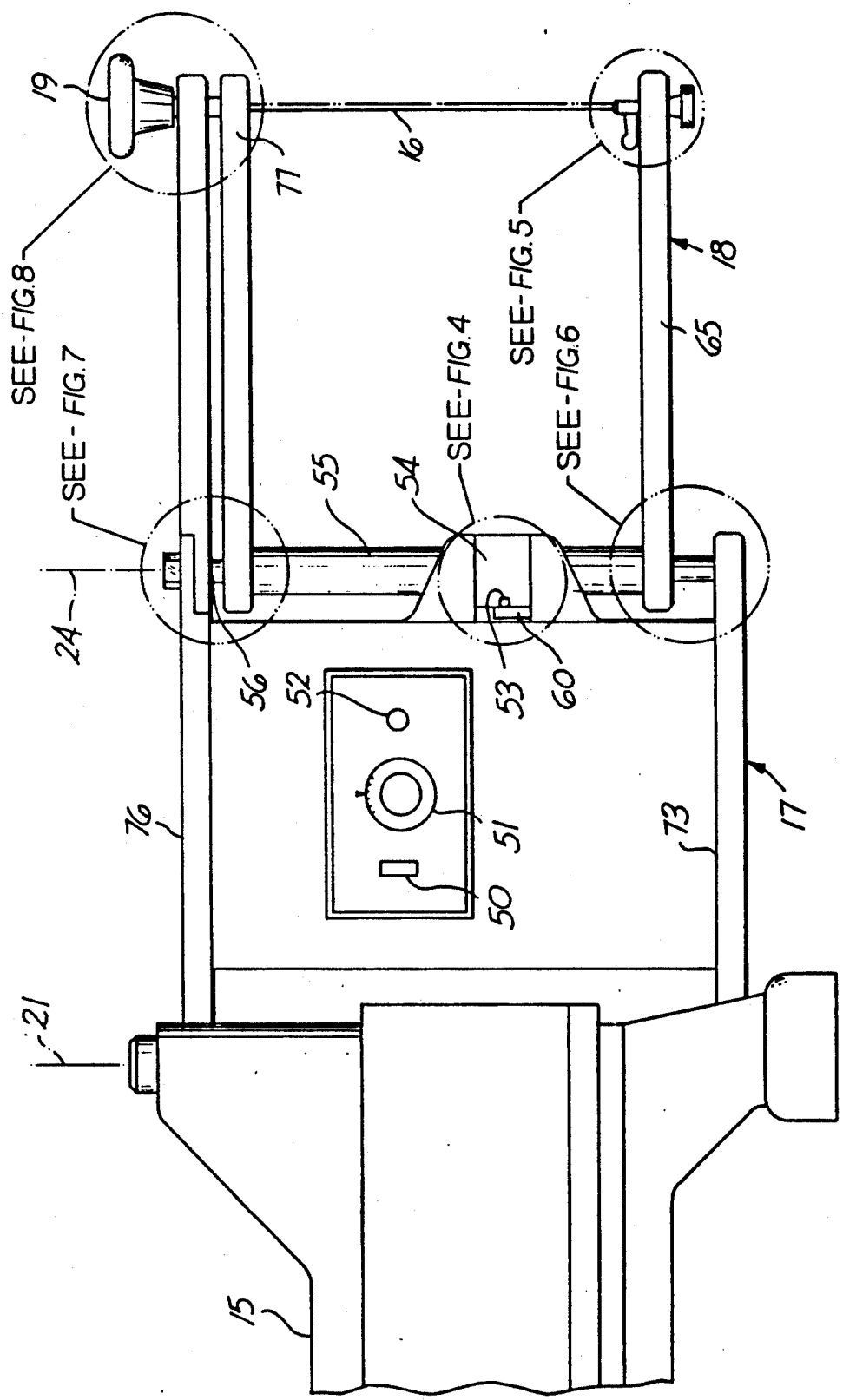
FIG. 3 is a side view, partly cut away, of a power driven bench mounted coping saw afforded by this invention.

As may be see from the sketch of FIG. 2, the workpiece 31 represents a molding strip with a contoured decorative surface 39 having a front end 40 cut at forty-five degrees to the longitudinal axis 37 and also beveled at forty-five degrees to the plane of the workpiece 31. These angular cuts may be done with the coping saw of this invention, but it is preferable for a precision straight line machinery guided cut to bevel the workpiece with an external rotary saw if available.

The purpose of the beveled cut 40 is to form a profile pattern 41 at the edge of the contoured surface 39 to be followed by the coping saw as manipulated manually by means of knob 19 to position the saw blade and rotate it for cutting the curved profile seen for example at 30 (FIG. 1) for a two dimensional cut, where the bevelled cut is disposed normally to the longitudinal axis 37 of the workpiece 31. A three dimensional cut with respect to the plane of the workpiece is obtained by positioning the workpiece with its plane making an acute angle with the sawblade.

With the workpiece tilted at forty-five degrees to horizontal (or to the axis of the sawblade 16, thereby making an acute angle therewith) as is suggested by the block 43 on horizontally disposed table top 44, a three dimensional pattern is cut in the end of the workpiece 31 when the coping saw blade 16 follows the edge marking 41 of the contoured surface. This then provides a perfectly fitting crown molding corner joint (for) a ninety degree corner) in the molding.

It has been shown how the bench mount coping saw of this invention has provided a different method of operation, namely by powering the coping saw to reciprocate the saw blade, rotating the reciprocating blade, and removing the blade in a range for cutting a multidimensional pattern in a workpiece held in a stationary position. This is achieved by a novel power driven coping saw system providing for the coping saw blade to rotate under manual control while reciprocating. Two dimensional cuts are achieved by placing the workpiece and saw blade planes normally to each other while cutting a two dimensional pattern. Three dimensional patterns are achieved by placing the workpiece and saw blade planes at acute angles, such as forty-five degrees, to each other while cutting a two dimensional pattern in the workpiece with the pivotable and rotatable saw blade.

Figure 4:
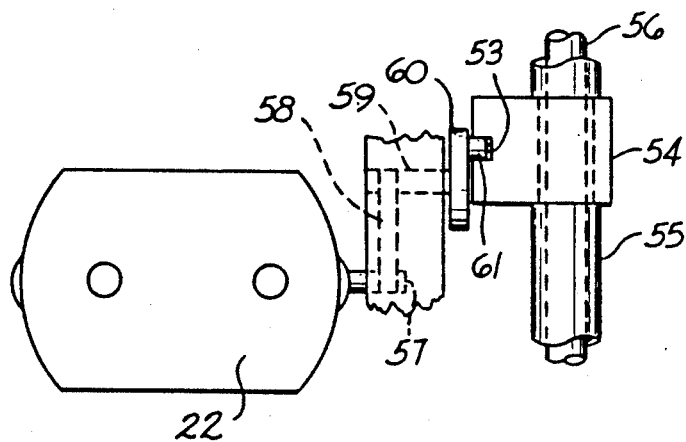
FIG. 4 is a fragmental view of a motor-saw drive mechanism taken from the circle 4 region of FIG. 3.

The bench mount coping saw provided by this invention is shown in more detail in FIGS. 3 to 8, where the phantom circle areas 4 to 8 are illustrated separately in FIGS. 4 to 8. Within the pivoting framework 17 is a motor controlled by an off-on switch 50 and speed control knob 51, with indicator light 52 available. The motor 22, as seen in FIG. 4, provides reciprocating motion by way of notch 53 in sleeve 54, journalled for reciprocating motion while permitting relative rotation at journalled cylindrical surface 62 with the cylindrical shaft 55 of the pivotable framework 18, which pivots about inner shaft 56. Thus, the motor shaft 57 is coupled by means of belt 58, or equivalent gearing, to shaft 59 of drive wheel 60 to reciprocate frame 18 by means of drive pin 61 as it rotates with drive wheel 60. As may be seen best in FIG. 1, the cyclindrical frame member 55 can reciprocate on pivot shaft 56 over a vertical distance defined by the pin 61 on drive wheel 60 for powering the coping saw reciprocally without impeding the ability to move the sawblade 16 and frame 18 about the pivot shaft 56.

Figure 5:
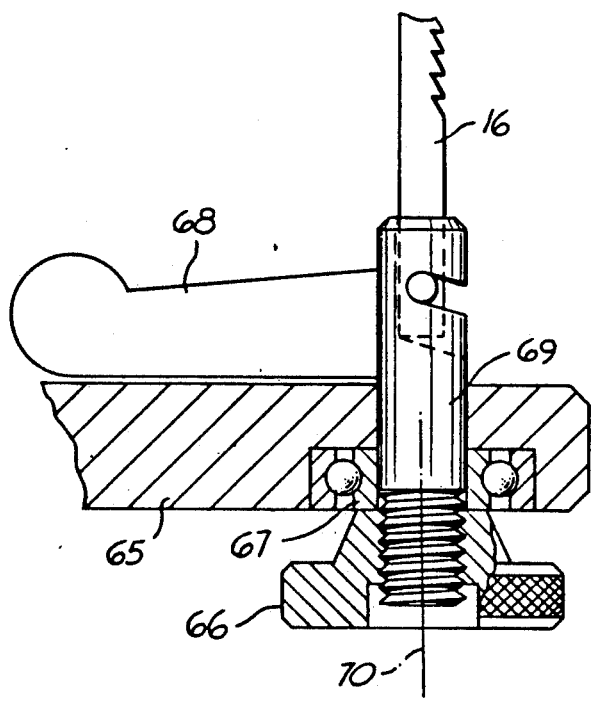
FIG. 5 is a fragmental view in more detail, partly in section, of the saw blade mount taken from the circle 5 region of FIG. 3.

As seen in FIG. 5, the sawblade 16 is rotatably secured in tension at the framework 18 arm 65 means of knurled nut 66 seated upon the ball bearing race 67. The lever arm 68 is manually held to align the sawblade 16 as the knurled knob 66 is adjusted for appropriate sawblade tension. The race 67 and journalled portion of the shaft 69 in arm 65 then permit the blade to rotate about its vertical axis 70, as later discussed.

Figure 6:
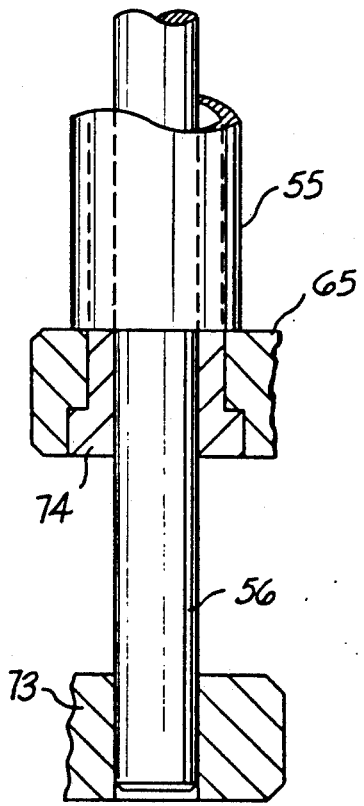
FIG. 6 is a fragmental view, in more detail, partly in section, of the lower pivot pin mount taken from the circle 6 region of FIG. 3.
Figure 7:
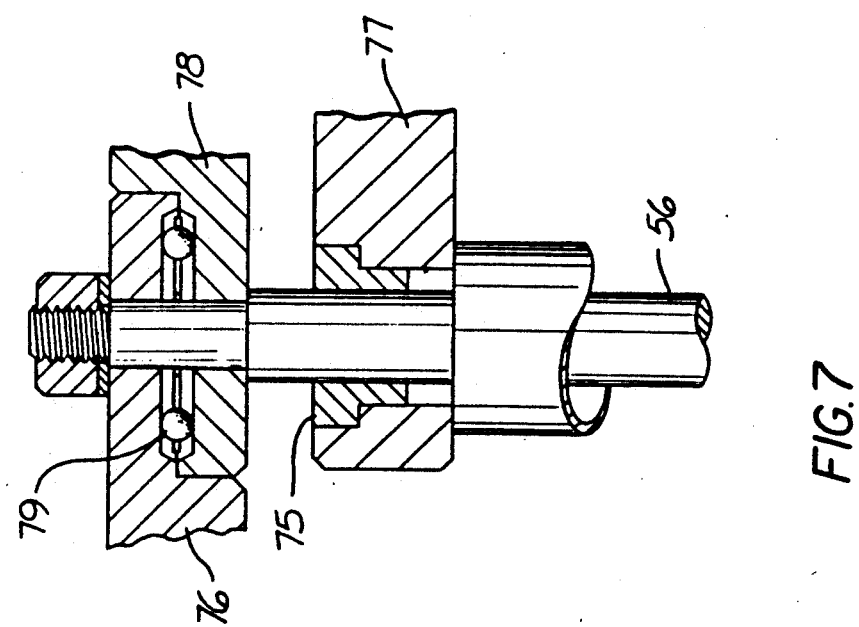
FIG. 7 is a fragmental view, in more detail, partly in section, of the upper pivot pin mount taken from the circle 7 region of FIG. 3.

As seen from FIG. 6, the pivot shaft 56 is journalled for pivoting in arm 73 of pivotable frame 17. Also the bushing 74 about pivot shaft 56, contained in lateral arm 65 of the reciprocating frame 18 journals the frame for vertical reciprocation. The corresponding upper bushing 75 in reciprocation frame 18 upper arm 77 is shown in FIG. 7.

Figure 8:
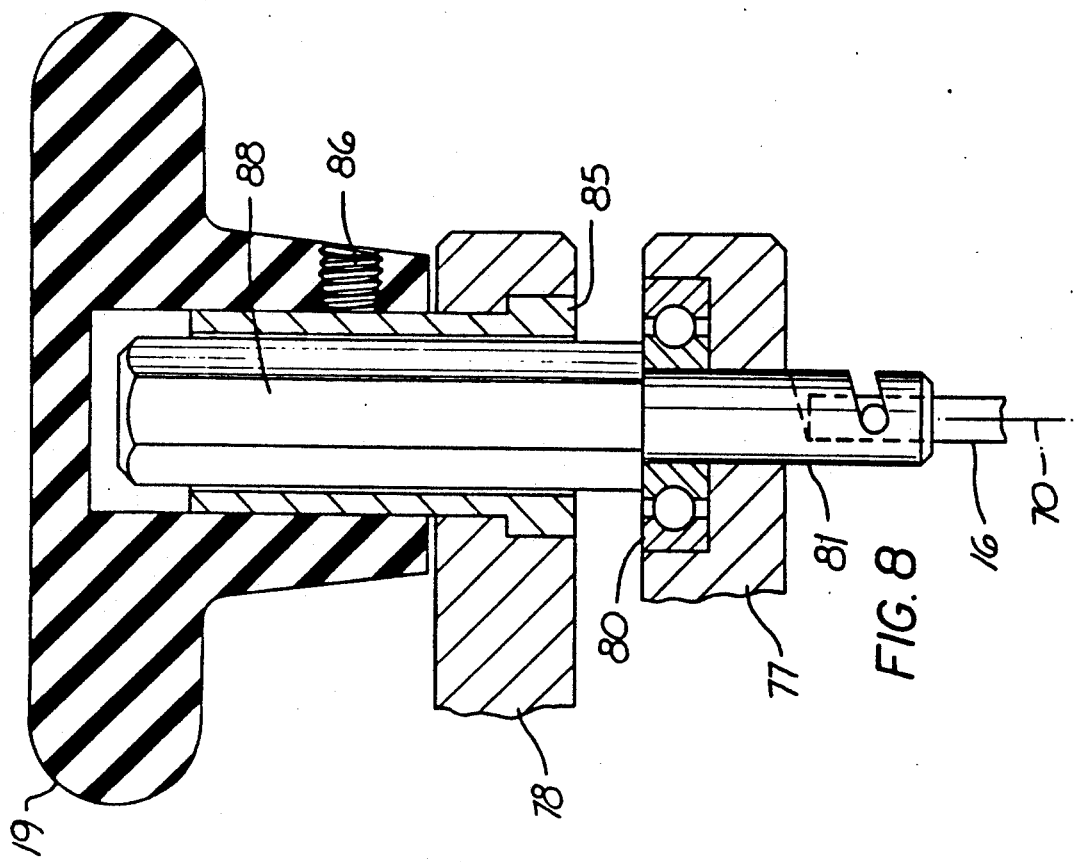
FIG. 8 is a fragmental view, in more detail, partly in section, of the manual control knob mount taken from the circle 8 region of FIG. 3.

The upper arm 76 of the motor mount pivotable frame 17 is journalled on pivot shaft 56 and is pivotally connected to a pivoting frame upper arm 78 by means of ball race 79. The relationship of the pivoting frame upper arm 78 and the upper arm 77 of the pivotable reciprocating saw frame 18 is shown in FIG. 8. Upper ball race 80 (together with lower ball race 67) permits rotation of the sawblade 16 about its axis 70 as retained in a conventional slotted catch member 81. Thus, the sawblade 16 may be rotated 360 degrees by means of manually held knob 19 to follow very sharp changes of direction with the blade in lateral two dimensional movement.

The upper pivot frame arm 78 is held in a fixed vertical plane, and the manual control knob 19 that pivots it (together with the reciprocating frame member 77) is rotatably journalled in arm 78 by means of bushing 85 and set screw 86. Thus the position of the saw blade may be established anywhere within the range of the two pivoting frames 17, 18 by manual manipulation of the knob 19 for positioning, in addition to rotation of the sawblade. The inner vertically disposed hollow surface of bushing 85 mates with hexagonal blade shaft extension 88 for freely permitting relative vertical reciprocation, thereby to permit the knob 19 also to control the rotation of blade 16 about its axis 70 while remaining in a fixed vertical position, and without transmitting the vibratory motion of the saw to the operating knob 19, which might tend to affect the operators craftsmanship and precision.

It is accordingly seen that this power driven saw system afforded by this invention operates in the unusual manner of moving the saw blade on a bench saw in a two dimensional pattern in a stationary workpiece rather than in the conventional manner of moving the workpiece with respect to a stationary blade mount position. With the saw axis held in a vertical position at all times by this mechanism a much more precise normal cut can be made through the plane of the workpiece than with a manually held conventional coping saw dependent in posture and alignment upon the craftsmanship skills of the operator. Accordingly perfect cuts can be accomplished with reasonable craftsmanship in following a two dimensional pattern on the workpiece even in such critical patterns as mating surfaces at corner joints in contoured surface chair rail moldings or crown moldings.

Note also that the saw and methods provided by this invention have the significant advantage of being able to end trim ling molding strips which would be very difficult to maneuver over a pattern for cutting in a powered bench saw having the cutting position fixed.

Having therefore improved the state of the art, those features of novelty defining the spirit and nature of the invention are set out with particularity in the following claims.

I claim:

1. The method of cutting a contoured pattern in a stationary workpiece comprising the steps of: holding a workpiece stationary, powering a coping saw to reciprocate a saw blade mounted to a saw frame rotating the saw blade relative to the saw frame while reciprocating, and moving the reciprocating blade in a pattern on the stationary workpiece while rotating the saw blade relative to the saw frame for cutting said contour pattern in said stationary workpiece.

2. The method of claim 1 further comprising the step of: cutting a three dimensional said workpiece having a flat planar surface while rotating the saw blade and moving the saw blade through the workpiece with the saw blade perpendicular to the flat surface for cutting a two dimensional pattern through the workpiece.

3. The method of claim 2 further comprising the step of: providing a three dimensional said workpiece and moving the saw blade in a plane disposed at an acute angle to said flat planar surface for cutting a pattern through the workpiece.

4. the method of claim 1 further comprising the steps of: providing a wooden molding strip workpiece longitudinally disposed along an axis to present a flat planar surface and a contoured decorative surface, cutting in a first step a pattern disposed across an end of the strip at an acute angle to the longitudinal axis thereby to define a cutting pattern at an intersection of the contoured surface and a surface cut through the workpiece, and cutting further in a second step a pattern across and through the strip with the cutting blade following said cutting pattern while rotating the saw blade.

5. The method of cutting a workpiece with a powered reciprocating coping saw blade, comprising the steps of: mounting the saw blade in a movable frame disposed upon a stationary base member for positioning the saw in a two dimensional pattern relative to the base reciprocating the movable frame rotating the saw blade in said movable frame, holding the workpiece in a fixed position, and sawing the workpiece reciprocating the movable frame with the blade while rotating the blade and moving the blade relative to the base.

6. A power driven coping saw system for moving a coping saw blade in a cutting pattern relative to a stationary workpiece comprising in combination a coping saw blade, a saw base frame supporting a reciprocation frame pivotably extending from the base frame for holding both ends of said coping saw blade, a motor supported by said base frame, a coupling mechanism from the motor to the reciprocation frame causing the motor to reciprocate said frame and coping saw blade, and blade mounting means for rotatably mounting said coping saw blade in said reciprocation frame for rotation of the saw blade while the frame reciprocation is reciprocating, whereby the saw blade may be moved in a path permitted by pivoting of the reciprocation frame, and thereby may follow a contoured cutting pattern of the saw blade as it moves in the path.

7. The saw system of claim 6 further comprising, a ball bearing mount supporting the saw blade for rotation in said frame.

8. The saw system of claim 6 further comprising, secondary pivotable frame member means positioned between the frame base and the reciprocation frame, a rotatable member journalling the reciprocation frame for rotation in said secondary frame, and means mounting said motor in the secondary pivotable frame member means for reciprocating the reciprocation frame.

9. The saw system of claim 6 wherein said blade mounting means further comprises a saw blade rotating handle aligned axially with the saw blade to rotate therewith, mounting means for positioning said handle at a stationary axial location aligned to pivot with said reciprocation frame, a hollow core in said rotating handle mounting, and a saw blade retaining shaft extending axially from the saw blade into said hollow core with means permitting longitudinal relative motion of the shaft and handle during reciprocation of the saw blade without axial movement of the rotating handle but requiring the saw blade sand the rotating handle to rotate together.

10. The coping saw system of claim 6 further comprising a pivotable motor mounting frame with said motor mounted thereon attached to the base frame, and means pivoting said reciprocation frame relative to said motor and motor mounting frame during reciprocation of the saw blade permitting the saw blade to swing to position within a pivot arc extending from the motor mounting frame while the blade is reciprocating.

11. The coping saw system of claim 6 further comprising, frame means for holding and pivoting said motor on said base.

12. The coping saw system of claim 6 further comprising, a workpiece support having a horizontal table member mounted in the vicinity of the base and reciprocation frame for holding a workpiece in a fixed position within the movement range of the coping saw for cutting a workpiece supported on the table in a contoured pattern in a plane perpendicular to the reciprocating saw blade in response to pivotable movement of the reciprocation frame and further in response to rotational movement of the coping saw blade in said blade mounting means.

13. The coping saw system of claim 6 wherein said blade mounting means further comprises, a non-reciprocating pivot arm carrying a manually rotatable handle coupled to rotate the saw blade in said reciprocation frame and disposed to pivot from a common pivot shaft with said reciprocation frame.

14. The coping saw system of claim 13 further comprising, a female hollow cavity in said manually rotatable handle, and a mating male member movable in and out of said cavity connected to reciprocate with and rotate with the saw blade position extending into said cavity to relatively reciprocally move back and forth in the cavity and to rotate in unison with the rotatable handle and the saw blade.

15. The coping saw system of claim 6 further comprising, means for supporting a workpiece in a fixed position within a movement range of the saw blade for cutting through the workpiece in a cutting pattern determined by pivoting the reciprocation frame and by rotating the coping saw blade.

16. The coping saw system of claim 15 further comprising, a three dimensional workpiece having a flat planar surface, and means for holding the workpiece planar surface in a plane inclined at an acute angle from a plane substantially perpendicular to the saw blade.

17. The coping saw system of claim 15 further comprising, means for holding a longitudinally disposed workpiece in an axial direction for cutting through the workpiece with the saw blade at an acute angle relative to the axial direction.

18. The coping saw system of claim 15 further comprising, a workpiece having at least two dimensions, and means to support the workpiece in position for cutting in the workpiece a pattern having a two dimensional configuration with the coping saw moving and rotating in said cutting pattern.

19. The coping saw system of claim 15 further comprising, a three dimensional workpiece, and means to support the workpiece in position for cutting a three dimensional surface configuration in the workpiece with the saw blade moving and rotating in said cutting pattern.

* * * * *